Jan. 19, 1932.  C. F. W. BATES  1,841,427
ELECTRIC TUBE
Filed Nov. 7, 1927
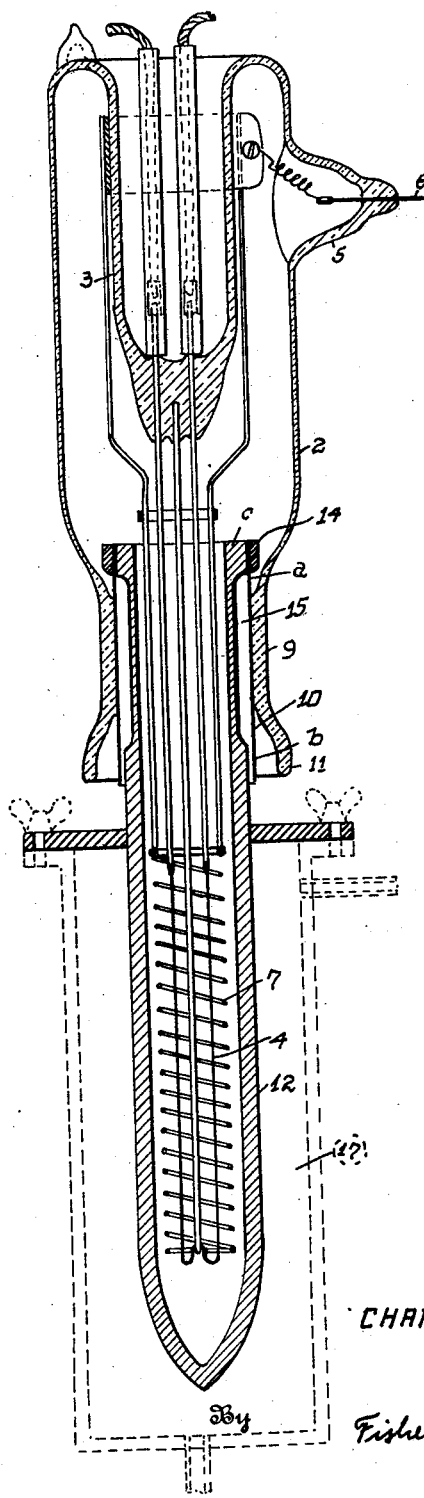
Inventor
CHARLES F. W. BATES
By Fisher, Moser & Moore.
Attorney Patented Jan. 19, 1932

1,841,427

UNITED STATES PATENT OFFICE

CHARLES FREDERIC WILLIAM BATES, OF CLEVELAND, OHIO

ELECTRIC TUBE

Application filed November 7, 1927. Serial No. 231,492.

The present invention pertains to an improvement in electric lamps, radiant energy tubes, and other devices wherein a hermetically sealed union is required between a hollow body made of glass or vitreous material, and an element or part made of metal. Broadly speaking it is an old practice in the art of making electric lamps and tubes to weld tubular elements of metal having thin walls to glass without fracture or breakage and with hermetical sealing effect, using platinum for the purpose. However, platinum is an expensive metal to employ, especially where large areas and quantities of that metal are involved. I have therefore devised a structure in which inexpensive metals such as copper and nickel or iron may be used with satisfactory results, in which special provision is made to permit an effective welded union to be produced between a glass body and a thin copper tube of uniform thickness throughout its length, in which the glass body is supported with slightly yielding effect, in which a glass skirt or extension is provided to prevent the seal from cracking, and in which metals of different properties and characteristics are employed to avoid oxidation and sealing of the metal and objectional deposits thereof within the glass body and upon any electric conducting element or electrode confined therein. This improved structure may be incorporated in various types of lamps and tubes, and therefore I do not wish to limit its adaptation and use to any particular type. But to exemplify one electrical appliance in which the invention may be utilized reference may be had to the single figure in the accompanying drawing, which figure is a diagrammatic view and sectional elevation of a power tube embodying my improvement.

This power tube comprises a hollow cylindrical body 2 made of glass which is closed at one end and includes a central supporting portion or stem 3 for an electric current conducting filament 4. A lateral branch 5 also forms part of glass body 2 through which a conductor or terminal 6 for a grid element 7 extends. These filament and grid leads are sealed in the glass walls according to known practices to permit the tube to be exhausted or evacuated. A hermetic seal is also required in another place in the glass body when an additional conductor or plate element 12 is included. In the present structure element 12 is connected to a metal sleeve which extends axially of the glass body through a reduced cylindrical neck or extension 9 thereof. The production of this article involves the heating of the glass to a high temperature and the sealing of the glass to the metal sleeve directly at neck 9. As previously stated I may use a platinum sleeve, but with the present structure I can employ instead a short tube or sleeve 10 of copper, using a known composition of glass which permits a sealing union to be made with copper. The sealing union or joint involves a substantial area of the meeting faces or surfaces of the glass and copper, and to effect a perfect seal the wall of the tube or sleeve 10 is relatively thin and of the same thickness from end to end. Furthermore, tube or sleeve 10 is relatively longer than the neck or reduced part of the glass body and so disposed in respect thereto that the inner end —a— of the tube extends a short distance into the hollow base of glass body 2 and the outer end —b— protrudes a short distance below and beyond the neck. Therefore it will be seen that the surface union of the glass to the cylindrical wall of tube or sleeve 10 is with a thin wall of the same thickness at all points and that the union is only made annularly at the middle of the tube or sleeve. As one result a secure union may be obtained and a perfect seal effected notwithstanding that one wall is of glass and the other of metal having a different coefficient of expansion. To avoid cracking of the seal the glass neck 9 is also continued or extended downwardly apart from the lower depending end —b— of tube or sleeve 10, preferably in the form of a skirt, flare or bell 11. The upper end —a— of the copper sleeve 10 is sleeved upon and welded to an annular enlargement —c— on a second tube 12 made of nickel, iron, steel, or other metal, plated or unplated. A band or collar 14 made of nickel, iron, steel or other metal, is sleeved over and welded to the upper end —a— of the copper tube or sleeve 10 so that the copper will be completely enclosed or covered within the evacuated chamber, the purpose being to protect the parts and surfaces within the device from oxidizing effects, and depositing of free metal within the evacuated chamber. The inner tube 12 may be reduced in diameter for a part of its length to provide an annular air space 15 around the middle part of sleeve 10 opposite the glass neck and seal, and the lower end of the sleeve is spaced apart or freely mounted upon the inner tube 12 to permit expansion and contraction of the sleeve in effecting a sealing union and to yieldingly support the glass body. From the foregoing it becomes obvious that the glass body 2 is yieldingly supported by the thin walled copper sleeve or tube 10, which in turn is supported by the upper end of a second tubular piece or part 12 closed or sealed to the atmosphere. As shown member 12 projects downwardly from sleeve 10 in the form of a hollow cylinder or shell, the length of which is such that it may contain the filament and grid and be readily confined within a water cooling jacket 17. Other cooling means may be introduced or provided, and the shape or form of the inner tube or plate 12 may be considerably modified without making any essential change in the sealing structure. Accordingly the present improvement is not confined to the exact structural form of plate member used, nor to the cooling means shown. Furthermore, the hollow part of the glass body and the various elements therein may also be constructed in other ways than as shown without departing from or affecting the improvement embodied in the sealing union herein described.

What I claim, is:

1. As an article of manufacture and sale, a hollow body of vitreous material, a metal sleeve extending into and welded directly in sealing union with said hollow body, a metal tube member extending into said sleeve and welded to one end thereof and a collar welded to said sleeve at the welding zone of said metal tube member and said sleeve.

2. As an article of manufacture and sale, a hollow body of vitreous material having a neck, a copper sleeve welded to said neck and extending into said hollow body, a metal tube closed at one end and welded at its open end to the sleeve extension, and a band welded to and covering said extension of said sleeve at its welding zone with said metal tube.

In testimony whereof I affix my signature.

CHARLES F. WM. BATES.